(12) United States Patent
Richards et al.

(10) Patent No.: US 9,365,305 B2
(45) Date of Patent: Jun. 14, 2016

(54) FORMING CONTAINER FOR PRODUCT ITEMS DURING PRODUCTION JOB

(71) Applicant: XEROX CORPORATION, Norwalk, CT (US)

(72) Inventors: Paul N. Richards, Fairport, NY (US); Richard Scarlata, Rochester, NY (US); Rui Amorim, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 536 days.

(21) Appl. No.: 13/874,533

(22) Filed: May 1, 2013

(65) Prior Publication Data
US 2014/0325942 A1    Nov. 6, 2014

(51) Int. Cl.
| | |
|---|---|
| B65B 5/02 | (2006.01) |
| B65B 5/06 | (2006.01) |
| B65B 5/10 | (2006.01) |
| B65B 25/14 | (2006.01) |
| B31B 1/06 | (2006.01) |
| B31B 1/26 | (2006.01) |
| B65G 47/90 | (2006.01) |
| B31B 1/00 | (2006.01) |
| B32B 1/06 | (2006.01) |
| B31B 1/74 | (2006.01) |
| B65B 7/00 | (2006.01) |
| B65H 31/00 | (2006.01) |
| B65B 7/20 | (2006.01) |

(52) U.S. Cl.
CPC . *B65B 5/024* (2013.01); *B31B 1/26* (2013.01); *B31B 1/74* (2013.01); *B32B 1/06* (2013.01); *B65B 5/06* (2013.01); *B65B 5/10* (2013.01); *B65B 5/105* (2013.01); *B65B 7/00* (2013.01); *B65B 25/143* (2013.01); *B65H 31/00* (2013.01); *B65B 7/20* (2013.01)

(58) Field of Classification Search
CPC ...... B65B 2210/04; B65B 5/024; B31B 1/88; B31B 1/00; B65G 47/90; B25J 1/06
USPC ........... 53/452, 456, 458, 475, 477, 484, 558, 53/566; 493/55, 162; 700/213, 217, 228, 700/245, 247
See application file for complete search history.

(56) References Cited

U.S. PATENT DOCUMENTS

| | | | |
|---|---|---|---|
| 5,403,056 A * | 4/1995 | Wallace | B65G 47/908 294/98.1 |
| 5,406,770 A | 4/1995 | Fikacek | |
| 5,426,921 A * | 6/1995 | Beckmann | B65B 43/185 414/792 |

(Continued)

*Primary Examiner* — Andrew M Tecco
*Assistant Examiner* — Praachi M Pathak
(74) *Attorney, Agent, or Firm* — Gibb & Riley, LLC

(57) ABSTRACT

A print job includes a container page, product pages, and a stacking pattern. Methods and systems automatically pattern a first material according to a container pattern specified by the container page to output a flat and patterned container sheet to a stacking location, and automatically fold the flat and patterned container sheet at the stacking location to form a three-dimensional container. Further, such methods and systems automatically print markings specified by the product pages on additional sheets of material. Then, after forming the three-dimensional container and printing the markings, such methods and systems automatically pattern the additional sheets of material according to a product pattern specified by the product pages to output product items to the stacking location. Further, such methods and systems automatically stack the product items in the three-dimensional container. The container pattern has a specific size and shape to accommodate the stacking pattern.

24 Claims, 8 Drawing Sheets

(56) References Cited

U.S. PATENT DOCUMENTS

| | | |
|---|---|---|
| 6,032,004 A | 2/2000 | Mirabella, Jr. et al. |
| 6,349,526 B1 | 2/2002 | Newman |
| 6,932,751 B1 | 8/2005 | Ward et al. |
| 7,647,752 B2 | 1/2010 | Magnell |
| 7,788,883 B2 | 9/2010 | Buckley et al. |
| 8,170,706 B2 | 5/2012 | Gombert et al. |
| 2006/0155561 A1 | 7/2006 | Harper |
| 2007/0112460 A1 | 5/2007 | Kiselik |
| 2010/0222908 A1* | 9/2010 | Gombert .............. G06F 17/50 700/98 |

* cited by examiner

FORMING CONTAINER FOR PRODUCT ITEMS DURING PRODUCTION JOB

BACKGROUND

Systems and methods herein generally relate to manufacturing processes, and more particularly to processes that stack product items in containers.

High speed digital printing systems exist which offers the ability to print, cut, and package custom products, such as signs in a single processing operation. Such processing is accomplished through printers, programmable laser cutters, and robotic stacking systems. The robotically stacked product can be directly stacked from an output belt to a stacking conveyor and transported to a shrink-wrap machine for final packaging. Such systems provide wide flexibility and can change the item produced from job to job.

However, during product robotic stacking, transportation, shrink wrapping and other post processing operations, the stack has the potential to fall during processing due to constantly changing product sizes, stack structural stability, or other mechanical or environment (air flow) conditions.

SUMMARY

Exemplary systems herein include (among other components) a computerized device that receives a processing or print job. The processing or print job includes data, such as data for a container page, data for product pages, and a stacking pattern. Such systems further include various patterning devices, which can be operatively (meaning directly or indirectly) connected to the computerized device. Such patterning devices automatically pattern a first or "container" material (according to a container pattern specified by the container page data) to output a flat and patterned container sheet to a stacking location.

Such systems can also include various robotic devices, such as a robotic folding device (also operatively connected to the computerized device). Such robotic folding device(s) automatically fold the flat and patterned container sheet at the stacking location to form a three-dimensional container, such as an open four-sided box with a bottom or a shipping box additionally with top flaps that open and close.

In addition, if the job is a print job, such systems can include a printing engine (which can be a separate device from, or incorporated into, the patterning device) that is similarly operatively connected to the computerized device. The printing device automatically prints markings specified by the product pages on additional sheets of material. Such additional sheets of material can be the same container material used to form the flat and patterned container sheet, or can be a second material that is different than the container material.

After forming the three-dimensional container and printing the markings on the additional sheets, the patterning device automatically patterns the additional sheets of material according to a product pattern specified by the data in the product pages, so as to output product items to the stacking location. Another robotic device that can be included in these systems is a robotic stacking device (which can be the same robotic device used to fold the flat and patterned container sheet, or can be a separate robotic device). Again, such a robotic stacking device is operatively connected to the computerized device. Further, the robotic stacking device automatically stacks the product items in the three-dimensional container. The three-dimensional container is maintained at the stacking location during the folding of the flat and patterned container sheet and the stacking of the product items.

Additionally, the patterning device can pattern multiple sheets of the container material initially before beginning patterning the additional sheets of material. Therefore, these systems can first output multiple flat container sheets that are stacked at the stacking location. Then, as additional ones of the three-dimensional container are needed to receive the stacking of the product items output by the patterning device (when the previously used container becomes full) the robotic folding device can obtain, one at a time, an additional flat and patterned container sheet from the multiple flat container sheets stacked at the stacking location. Again, the robotic folding device folds the newly acquired flat and patterned container sheet to form the next three-dimensional container so the robotic stacking device can begin stacking product items in that just folded three-dimensional container.

After each three-dimensional container becomes full with the stacked product items, the robotic folding device automatically folds the cover flaps of the three-dimensional container. The system further comprises an automated sealer device (that is also operatively connected to the computerized device) that can be a stapling device, a gluing device, a bonding device, a strapping device, a shrink-wrapping device, etc. Such a sealer device automatically seals the cover flaps of the three-dimensional container after the robotic folding device automatically folds the cover flaps down.

There can be a series of different processing or print jobs, and each of the print jobs in the series can have a different container pattern in the container page, different product pattern in the product pages, different printing requirements, different stacking patterns, etc. However, in all such jobs, the container pattern is established in the processing or print job to have a specific size and shape specialized to accommodate the product items stacked according to the stacking pattern. Therefore, with systems herein, each different processing job produces (in the same processing run) a customized container sized specifically to match the product items that are produced in that run, and the size and shape of such a customized container matches the size and shape of the product items produced in that processing run, as well as the stacking pattern that will be used for such product items when they are placed in the customized container.

Exemplary methods herein receive a print job that includes a container page, product pages, and a stacking pattern. Such methods automatically pattern a container material according to a container pattern specified by the container page to output a flat and patterned container sheet to a stacking location, and automatically fold the flat and patterned container sheet at the stacking location to form a three-dimensional container.

Further, such methods automatically print markings specified by the product pages on additional sheets of material. Such additional sheets of material can be the same container material used to form the flat and patterned container sheet, or can be a second material that is different than the container material. Then, after forming the three-dimensional container and printing the markings, such methods automatically pattern the additional sheets of material according to a product pattern specified by the product pages to output product items to the stacking location. Further, such methods automatically stack the product items in the three-dimensional container. These methods maintain the three-dimensional container at the stacking location while folding the flat and patterned container sheet, and while stacking the product items into the three-dimensional container.

The patterning of the container material can first pattern multiple sheets of the container material to output multiple flat container sheets stacked at the stacking location, before any of the product items are produced. Then, a flat and patterned container sheet can be obtained, one at a time, each time a currently used three-dimensional container becomes full (during the product item stacking operation). The newly acquired flat and patterned container sheet (from the multiple flat container sheets stacked at the stacking location) is folded into a new three-dimensional container and used for the stacking of the subsequently produced product items.

In addition, after each three-dimensional container is stacked full of the product items, these methods can automatically fold the flaps of the cover of the three-dimensional container (if present) and automatically seal the cover flaps of the three-dimensional container.

There can be a series of different processing or print jobs and each of the different jobs in the series can have a different container pattern in the container page, different product pattern in the product pages, different printing requirements, and/or different stacking patterns, etc. However, in all such jobs, the container pattern is customized in the processing job (or print job) to have a specific size and shape that accommodates the product items stacked according to the stacking pattern. Thus, the container pattern has a specific size and shape to accommodate the stacking pattern, which is customized for each different processing job or print job. Therefore, with methods herein, each different processing job produces (in the same processing run) a customized container that is sized specifically to the product items that are produced in that run, and the size and shape of such a customized container matches the size and shape of the product items produced in that processing run, as well as the stacking pattern, stacking height, etc., that will be used for such product items when they are stacked in the customized container.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, during product robotic stacking, transportation, shrink-wrapping and other post processing operations, a stack of product items has the potential to fall during processing due to constantly changing product sizes, stack structural stability, or other mechanical or environment (air flow) conditions.

Therefore, the systems and methods herein provide a robust in-line process that acts on a single set of instructions (a single processing job) to perform laser cutting of product items and robotic picking of such product items, along with the formation of a custom product container (e.g., an open-ended or closed box) that is specifically formed to have a size and shape to hold stacks of said product items.

The systems and methods herein allow a robot to freely place product items in the custom container without requiring fine motion control and placement detail. The systems and methods also enable a wide range of sizes and shapes for the product items and custom containers, which allows the product items to be stacked and retained without concern of system shut down due to set or stack integrity. The custom container formed in this process can contain printing to communicate any form of information required. Thus, the systems and methods herein provide productivity improvement, cost improvement, reliability enhancement, ease of shrink wrapping or post processing, and produce a "ready to ship" package.

Figure 1:
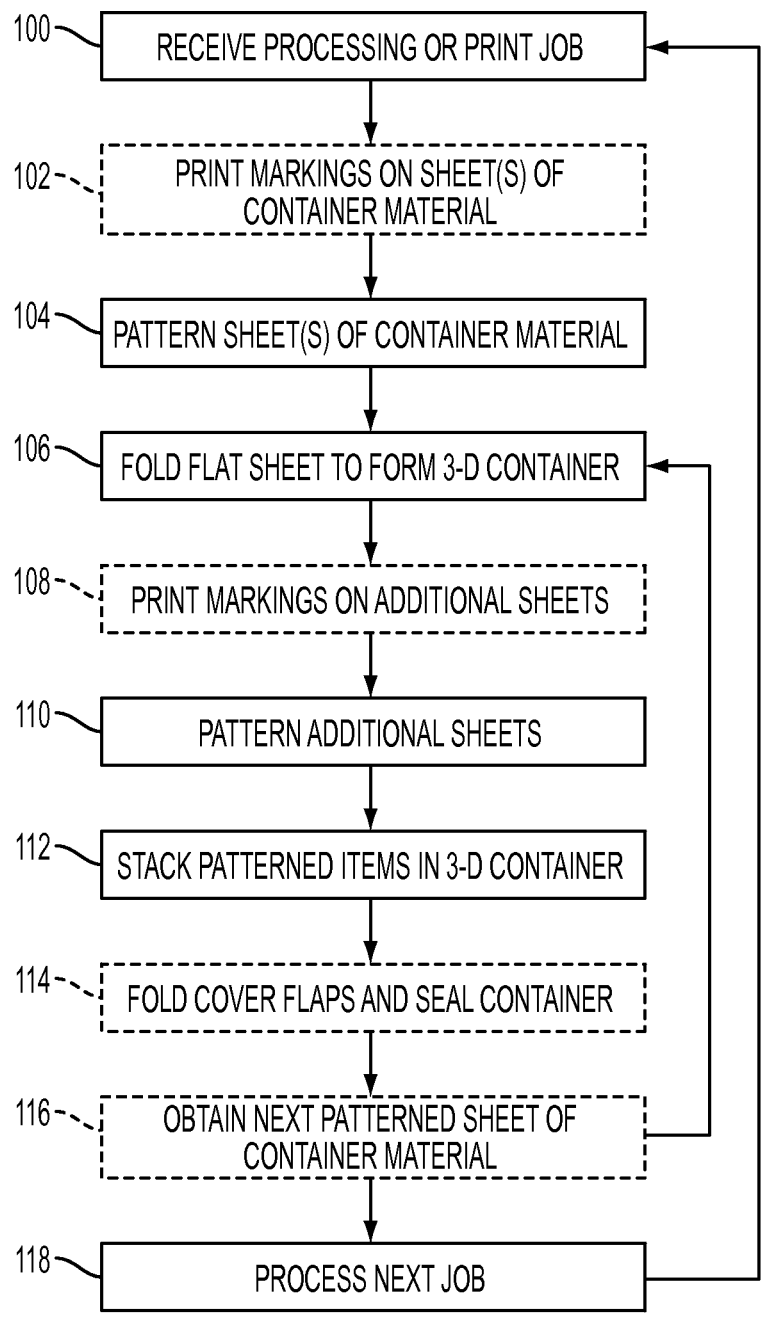
FIG. 1 is a flow diagram of various methods herein.

FIG. 1 is flowchart illustrating exemplary methods herein. In item 100, these methods receive a processing job or print job that includes a container page, product pages, and a stacking pattern. Each different processing/print job received can have different printing instructions and different patterning instructions within the product pages. For example, the printing instructions can print markings on sheets of media, and the patterning instructions can cut each sheet of media into many individual products, and the pattern to which the sheets of media are cut usually corresponds to items that are printed on the sheets of media. Therefore, in one example, one or many display signs can be printed on a single sheet of media (such as a sheet of plastic, cardboard, metal, wood, fiberglass, etc.), and the sheet of media can be patterned (meaning cut into individual pieces) to produce many distinct display signs from each single sheet of media.

Each successive processing/print job can produce a different number of products and differently sized products. By including custom printing and patterning instructions within the container page of each different processing/print job, the systems and methods herein produce a customized container (such as an open or closed box) that is sized to specifically match the size and number of the products that will be generated by the processing/print job. In addition, the customized container can contain customized markings that are specific to the processing/print job (such as handling instructions, delivery instructions, storage instructions, content identification, etc.).

Also, the instructions within the container page are processed immediately before the instructions within the product pages (e.g., no intervening instructions) so that the customized container and associated products are output from the processing device to the same location one immediately after the other (without intervening output between such items). When it is said that the products are produced "immediately" after the container, this means that the container is produced and then the products are produced by (output from) the same machine, without pausing for any intervening processing steps, and without any intervening human action or steps being required.

Thus, the container (in the form of a flat pattern sheet) is first output from the processing device (e.g., patterning device) to an area where a robotic device is located, where the robotic device folds the flat patterned sheet into a three-dimensional container. In the next processing step, the products themselves are output from the same processing device to the area where the robotic devices located and are stacked into the three-dimensional customized container by the same robotic device. In many cases, the same sheets of material that are used to make the products can be used to make the customized container (although those ordinarily skilled in the art would understand that different types of materials could be utilized for the products and the customized container).

Therefore, the systems and methods herein produce a customized container for each customized product. The customized container can contain custom markings, is made to a custom size (and even to a custom size that is customized only with respect to a specific product count) that is specifically customized to match the immediately subsequently produced uniquely sized products. This allows the systems and methods herein to continually print different sized containers (with different markings) on-the-fly as different processing/print jobs are received, without requiring any user intervention to change machine settings (without requiring any manual set up or requiring the user to change the container size) between processing/print jobs.

As shown in item 102 (which uses dashed lines to show it is optional) such methods optionally automatically print markings on a flat (meaning two-dimensional) sheet of first material (sometimes referred to herein as a "container material") according to a print marking instructions specified by the container page.

As shown in item 104, such methods automatically pattern the flat sheet of first material (which may or may not contain markings, depending upon whether the optional printing in item 102 is performed). Such "patterning" processes herein cut smaller items from larger sheets, form creases, and/or form openings using a die cutter, laser cutter, or similar equipment. The patterning of the flat sheet of container material is performed according to a container pattern specified by the container page. This allows these methods to output a flat and patterned (and potentially printed) container sheet to a transport belt that moves the flat and patterned container sheet to a stacking location.

While the user can specify the container pattern, the custom size and shape of the container can be automatically calculated by systems and methods herein simply based on the size of the product items (from the pattern in the product data) and the product item count. For example, a print job may specify 100 product items that are to be cut to a product item size of 6 cm×6 cm. Method and systems herein can automatically determine that (for a specific container sheet size) 4 product stacks can be accommodated in a 2-dimensional area of 13 cm×13 cm (allowing 1 cm in each dimension for some misalignment/processing tolerances) and that to make all 4 stacks equal in height, each stack can be 25 products high (100/4=25). Given the thickness of the product sheets, the container height can be automatically calculated (again allowing room for some misalignment/processing tolerances). With the dimensions of the container having been automatically calculated, predetermined fold lines, tabs, slots, etc., (as is understood by those ordinarily skilled in the art) can be scaled from a standard container pattern template to automatically form the custom cutting pattern of the container pattern for this print job (without any container size or shape input needed from the user).

Subsequently, in item 106, such methods automatically fold the flat and patterned container sheet at the stacking location to form a three-dimensional container. Further, in item 108 (which uses dashed lines to show it is optional) such methods optionally automatically print markings specified by the product pages on additional sheets of material. Again, such additional sheets of material can be the same as the container material used to form the flat and patterned container sheet, or can be a second material that is different than the container material.

Then, after forming the three-dimensional container in item 106 and printing the markings in item 108, in item 110 such methods automatically pattern the additional sheets of material according to a product pattern specified by the product pages to output product items to the stacking location.

Following this, in item 112, such methods automatically stack the product items in the three-dimensional container in the pattern specified by the stacking pattern received in item 100. These methods can maintain the three-dimensional container at the stacking location from the time when the flat and patterned container sheet is folded into the three-dimensional container in item 106, continuously through the time when the product items are stacked into the three-dimensional container in item 112.

In addition, after each three-dimensional container is stacked full of the product items, these methods can optionally automatically fold the flaps of the cover of the three-dimensional container (if flats are present) and automatically seal the cover flaps of the three-dimensional container, as shown by item 114 (which uses dashed lines to show it is optional). Alternatively in item 114, if the container is simply an open-top box, the sealing process can be a shrink wrapping process, etc.

The process of patterning the container material in item 104 can first pattern multiple sheets of the container material to output multiple flat container sheets stacked at the stacking location, before any of the product items are produced. Thus, in an optional process shown in item 116 (which uses dashed lines to show it is optional) after the very first container is filled, additional flat and patterned container sheets can be obtained, one at a time, each time a currently used three-dimensional container becomes full (during the product item stacking operation in item 112). The flat and patterned container sheet newly acquired from the multiple flat container sheets stacked at the stacking location in item 116 is folded into a new three-dimensional container (as shown by the processing arrow returning to item 106 from item 116) and is used for the stacking of the subsequently produced product items in item 112.

As noted above, there can be a series of different processing or print jobs (as indicated by the arrow returning the flow from the "process next job" item 118 to item 100) and each of the different jobs in the series can have a different container pattern in the container page, different product pattern in the product pages, different printing requirements, and/or different stacking patterns, etc. However, in all such jobs, the container pattern is established in the processing job (or print job) automatically or manually to have a specific size and shape to accommodate the product items stacked according to the stacking pattern.

Thus, the container pattern has a specific size and shape to accommodate the stacking pattern, which is customized for each different processing job or print job. Therefore, with methods herein, each different processing job first produces (in the same processing run) a customized container that is sized specifically to the product items that are produced immediately thereafter in that run, and the size and shape of such a customized container matches the size and shape of the product items produced in that processing run, as well as the stacking pattern, stacking height, etc., that will be used for such product items when they are stacked in the customized container.

Figure 2:
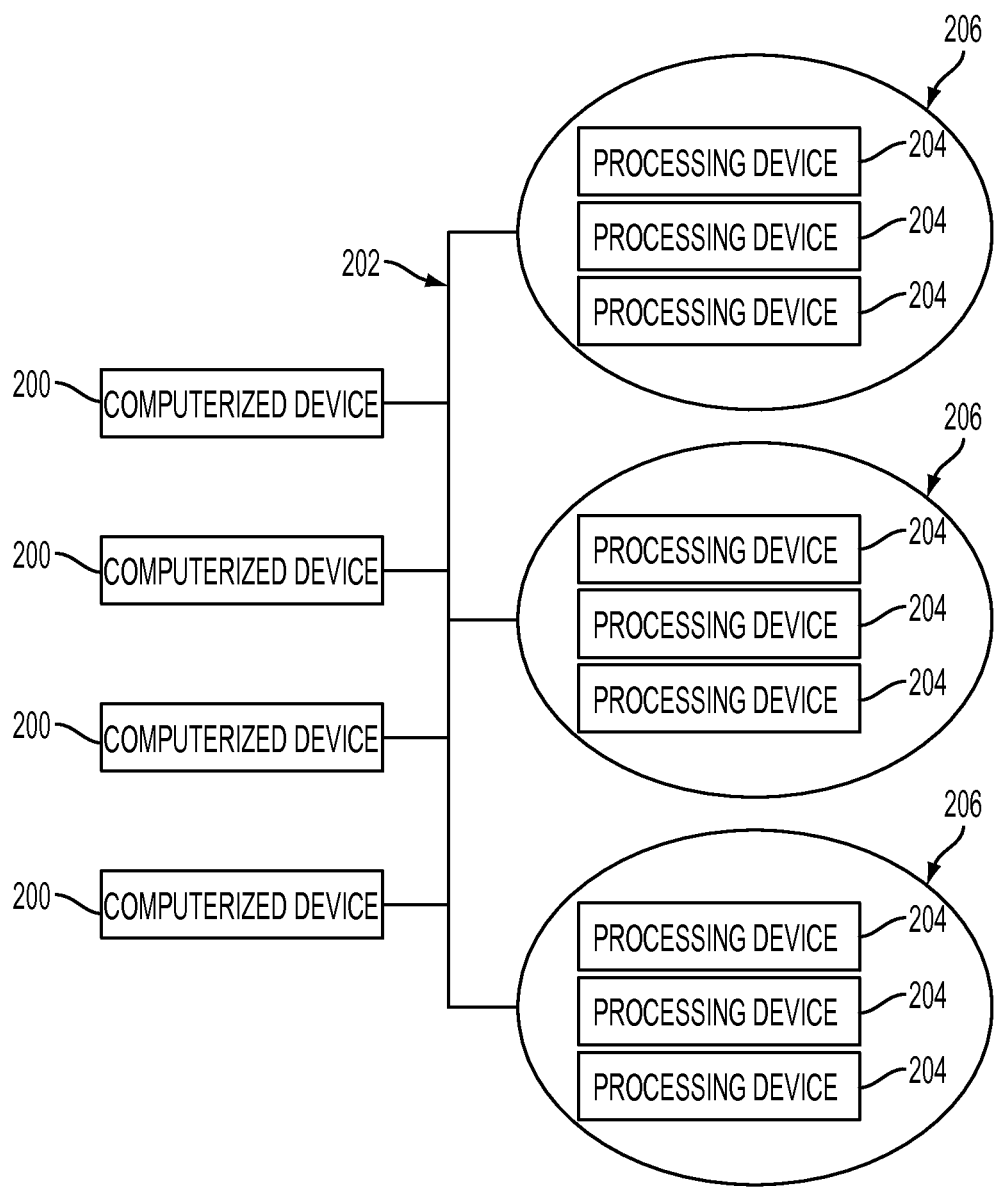
FIG. 2 is a schematic diagram illustrating systems herein.

As shown in FIG. 2, exemplary systems herein include various processing (printing and/or patterning) devices 204 located at various different physical locations 206. Also, computerized devices 200, which can include servers, personal computers, etc., are in communication (operatively connected to one another and to the processing devices 204) by way of a local or wide area (wired or wireless) network 202.

As shown in FIG. 2, one of the computerized devices 200 receives or creates a processing or print job and sends the job to one of the processing devices 204 (or the processing devices 204 can include processor devices that receive the processing job or print job). The processing or print job includes data, such as data for a container page, data for product pages, and a stacking pattern. Alternatively, the computerized device 200 or processing device 204 can automatically independently calculate an optimum pattern for cutting printed sheets that minimizes waste of the production items, can calculate an optimum or most efficient stacking pattern, can calculate a container shape and size that is optimum or most efficient for the production items to be stacked, etc. Therefore, all cutting patterns discussed herein can be calculated on-the-fly as different processing/print jobs are created or received by the systems and method herein.

Figure 3:
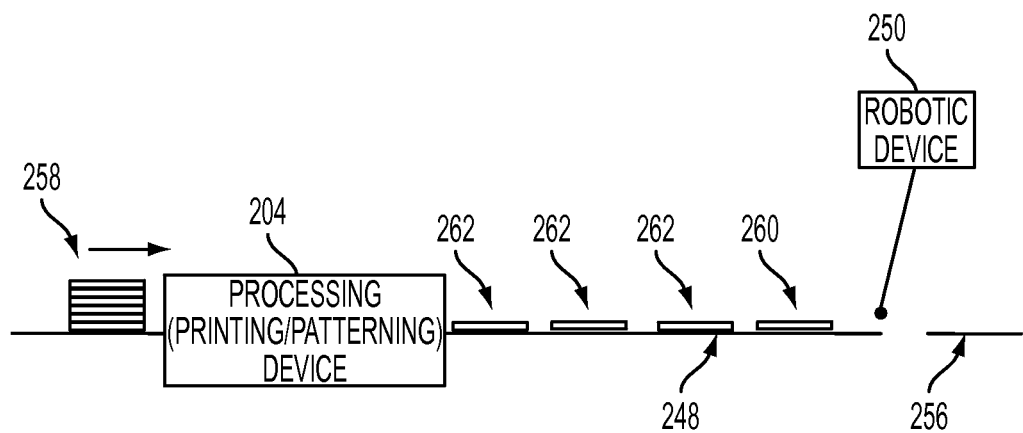
FIG. 3 is a schematic diagram illustrating devices herein.
Figure 4:
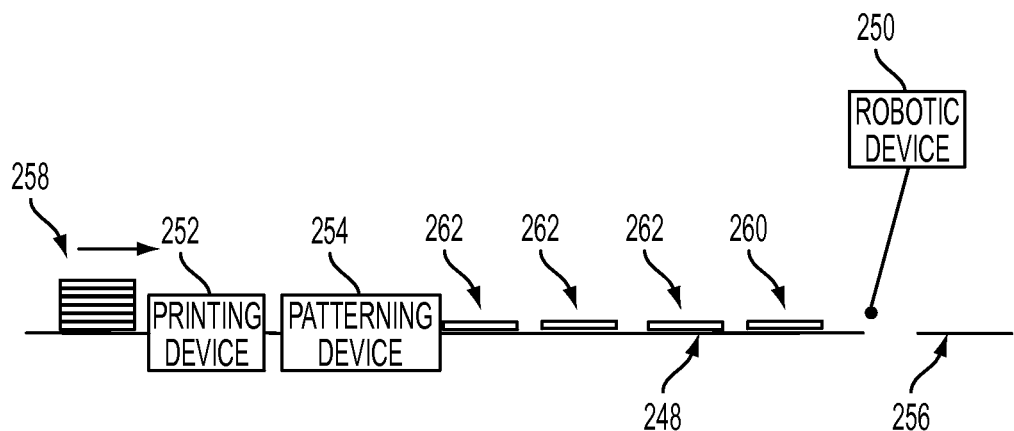
FIG. 4 is a schematic diagram illustrating devices herein.

As shown in FIG. 3, the printing device and patterning device can be combined into a single processing device 204. Alternatively, as shown in FIG. 4, the printing device 252 can be a distinct and separate device from the patterning device 254. As shown in FIGS. 3 and 4, sheets of material 258, which can all be the same or can be different types of media (different materials, different thicknesses, different colors, different sizes, etc.) are input to any of the devices 204, 252, 254.

As shown in FIGS. 3 and 4, the first sheet processed by systems and devices herein is a first or "container" material and the container material sheet is patterned according to a container pattern specified by the container page data. This flat and patterned container sheet 260 is output to a belt 248 that moves items to a stacking location 256.

Figure 5:
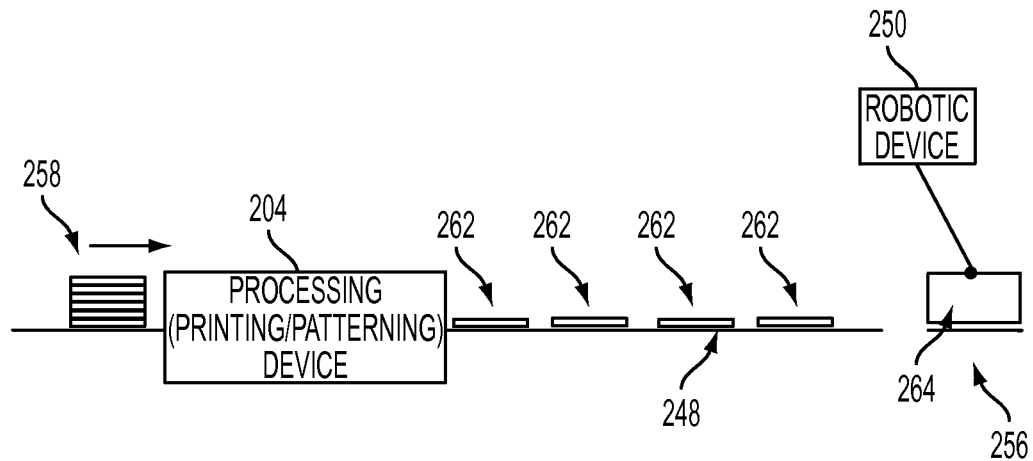
FIG. 5 is a schematic diagram illustrating devices herein.

Such systems can also include various robotic devices 250, such as a robotic folding device 250 (also operatively connected to the computerized device 200). As shown in FIG. 5, such robotic folding device(s) 250 automatically fold the flat and patterned container sheet 260 at the stacking location 256 to form a three-dimensional container 264, such as an open top four-sided box with a bottom, or a closable shipping box (e.g., four-sided box with a bottom with top flaps that open and close).

In addition if the job is a print job, such systems can include a printing engine 252 (which can be a separate device from, or incorporated into, the patterning device 204) that is similarly operatively connected to the computerized device 200. The printing device 252 automatically prints markings specified by the product pages on additional sheets of material. Such additional sheets of material can be the same container material used to form the flat and patterned container sheet, or can be a second material that is different than the container material.

Figure 6:
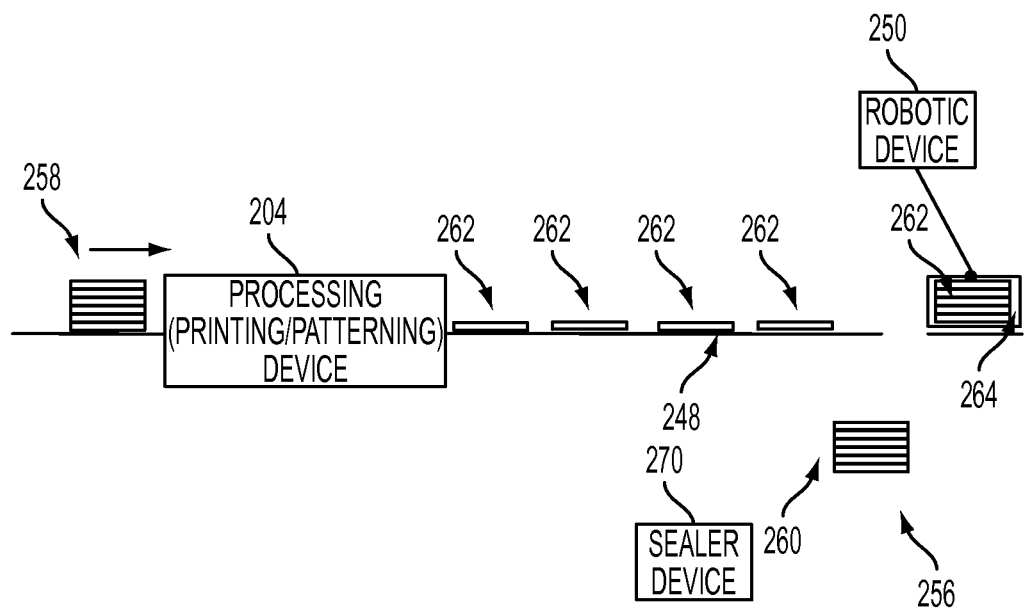
FIG. 6 is a schematic diagram illustrating devices herein.

After forming the three-dimensional container 264 and printing the markings on the additional sheets, the patterning device 254 automatically patterns the additional sheets of material according to a product pattern specified by the data in the product pages, so as to output product items 262 to the belt 248 that moves items to the stacking location 256. Another robotic device 250 that can be included in these systems is a robotic stacking device 250 (which can be the same robotic device 250 used to fold the flat and patterned container sheet). Again, such a robotic stacking device 250 is operatively connected to the computerized device 200. Further, the robotic stacking device 250 automatically stacks the product items 262 in the three-dimensional container 264, as shown in FIG. 6. The three-dimensional container 264 is maintained at the stacking location 256 during the folding of the flat and patterned container sheet and the stacking of the product items 262.

As additionally shown in FIG. 6, the patterning device 254 can pattern multiple sheets of the container material initially before beginning patterning the additional sheets of material. Therefore, these systems can first output multiple flat container sheets 260 that are stacked at the stacking location 256. Then, as additional ones of the three-dimensional container 264 are needed to receive the stacking of the product items 262 output by the patterning device 254 (when the previously used container 264 becomes full) the robotic folding device 250 can obtain, one at a time, an additional flat and patterned container sheet 260 from the multiple flat container sheets stacked at the stacking location 256. Again, the robotic folding device 250 folds the newly acquired flat and patterned container sheet to form the next three-dimensional container 264 so the robotic stacking device 250 can begin stacking product items 262 in that just folded three-dimensional container 264.

After each three-dimensional container 264 becomes full with the stacked product items 262, the robotic folding device 250 automatically folds the cover flaps of the three-dimensional container 264, if such are present. The system can further comprise an automated sealer device 270 (that is also operatively connected to the computerized device 200) that can be a stapling device, a gluing device, a bonding device, a strapping device, a shrink-wrapping device, etc. Such a sealer device 270 automatically secures any open top container box and/or seals the cover flaps of the three-dimensional container 264 after the robotic folding device 250 automatically folds the cover flaps down.

Figure 7:
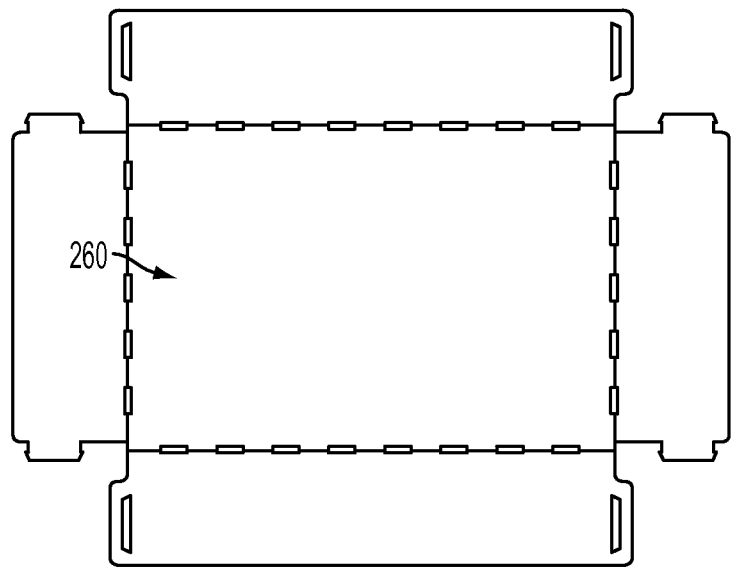
FIG. 7 is a schematic diagram illustrating a container sheet herein.

As discussed above, a flat sheet of container material 260 can be directly in-line laser cut (or die cut) as the first item cut in a processing job (which is immediately followed by cutting of the product items). FIG. 7 illustrates a flat sheet of container material 260 patterned into an exemplary pattern. As also mentioned above, the flat sheet of container material 260 is the first sheet processed through the cutter or patterning device within a printed set or print job. The robot 250 picks the flat patterned container material from the laser belt surface, presses it using a folding die, and places the folded container on the conveyor belt to allow for product stacking inside the container.

Figure 8:
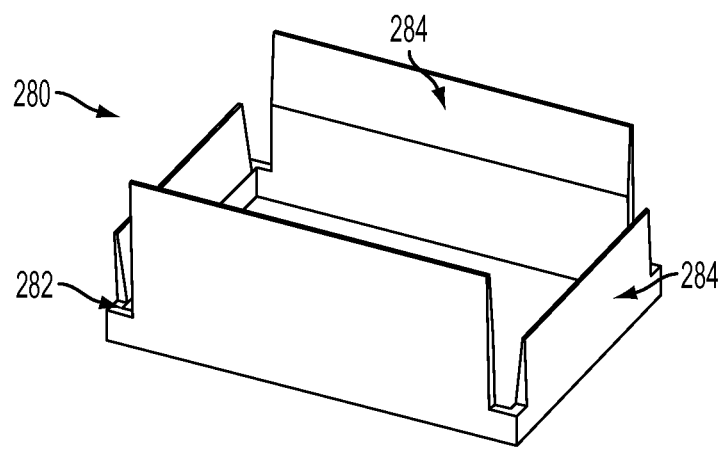
FIG. 8 is a schematic diagram illustrating a container die herein.

An exemplary folding die 280 is illustrated in FIG. 8. The folding die 280 can change size and shape so as to fold different sized customized containers 264. The folding die 280 can change size and shape by using actuators 282 connected to the sides 284 of the die 280. The actuators 282 are also operatively connected to the computerized device 200 and receive the container page that specifies the size of the custom container 264. More specifically, the actuators 282 can make the sides 284 of the die 280 move closer or further away from each other to change the size and shape of the die 280. Alternatively, different sized folding dies 280 can be maintained within the stacking area 256 and can be used by the robotic device 250 so as to accommodate the folding of different sized customized containers 264.

Figure 9:
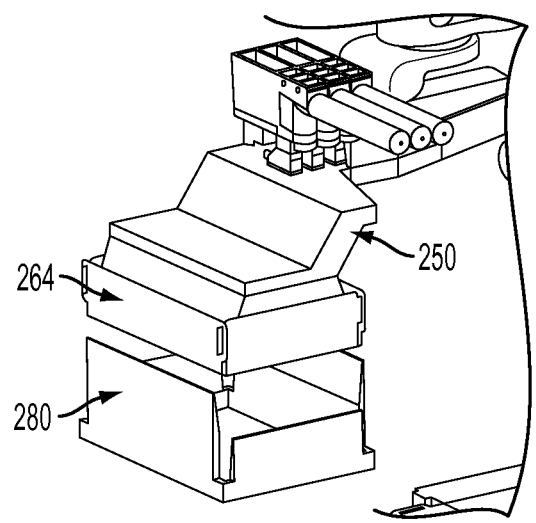
FIG. 9 is a schematic diagram illustrating devices herein.
Figure 10:
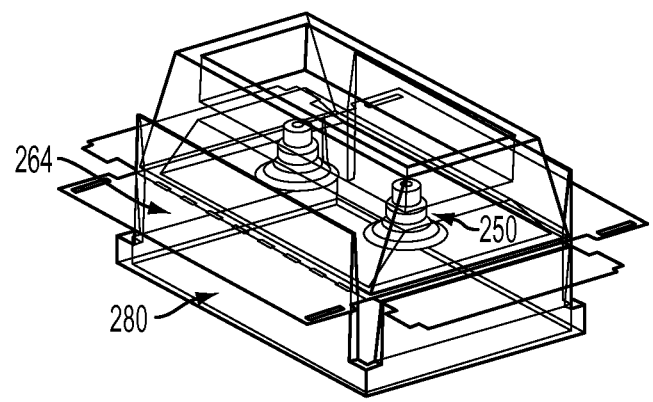
FIG. 10 is a schematic diagram illustrating devices herein.

The robotic device 250 using the folding die 280 to fold the flat sheet of container material 260 into the three-dimensional container 264 is shown in FIG. 9. FIG. 10 is a cutaway view of the robotic device using the folding die 280 to fold the flat sheet of container material 260. Thus, as shown in FIGS. 8-10, the robotic device 250 positions the flat patterned container material sheet 260 over the forming die 280. This motion relative to the die 280 enables the flat patterned container material sheet 260 to be formed into the final three-dimensional container 264.

Figure 11:
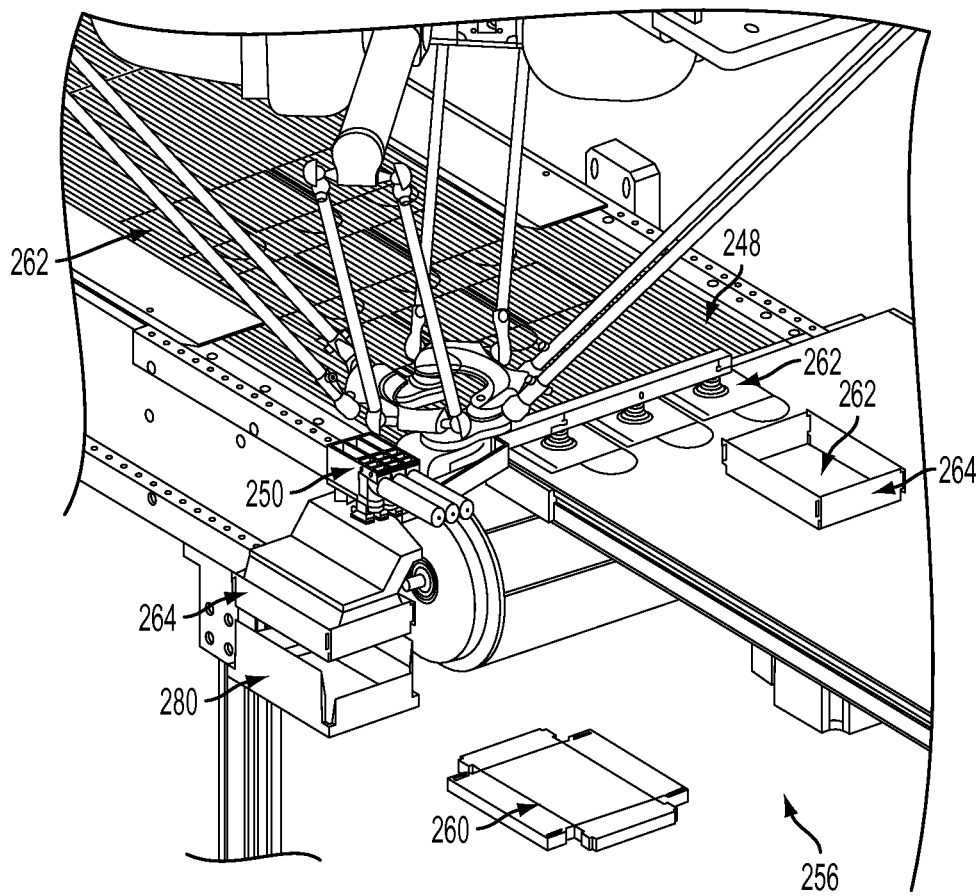
FIG. 11 is a schematic diagram illustrating devices herein.

FIG. 11 illustrates many of the items discussed above in perspective view, including the product items 262 moving along the belt 248 and being stacked by the robotic device 250 into the customized container 264 at the stacking location 256. As also mentioned above, many flat patterned container material sheets 260 can be produced as the first part of a production job. Such flat patterned container material sheets 260 are shown in FIG. 11 as being stacked (potentially in a holding bin) beside the stacking conveyor location 256. As also shown in FIG. 11, the robot 250 picks the top flat patterned container material sheet 260 from the stack, folds it over the folding die 280, and places the now three-dimensional container 264 on the stacking location 256 so that the container 264 can receive product items 262 from the robotic device 250.

Figure 12:
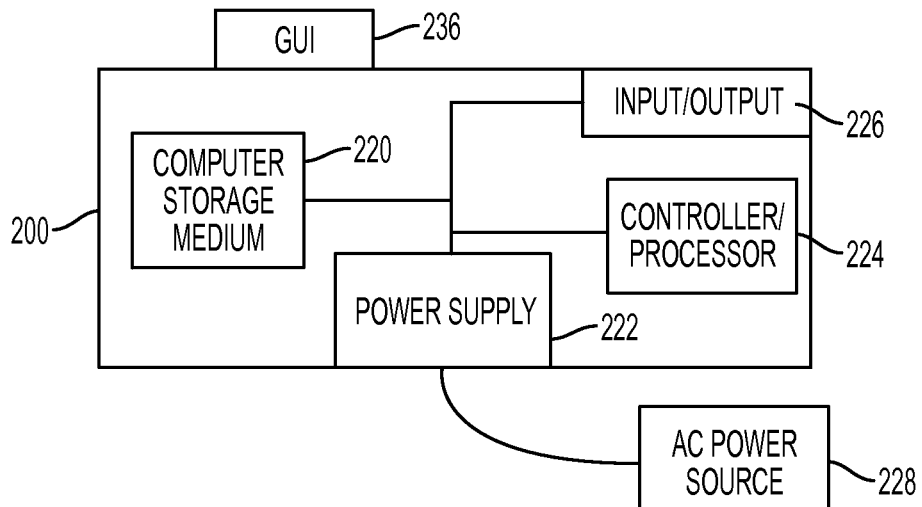
FIG. 12 is a schematic diagram illustrating devices herein.

FIG. 12 illustrates more details of one of the exemplary computerized devices mentioned above 200, which can be used with systems and methods herein and can comprise, for example, a print server, a personal computer, a portable computing device, etc. The computerized device 200 includes a controller/processor 224 and a communications port (input/output) 226 operatively connected to the processor 224 and to the computerized network 202 external to the computerized device 200. Also, the computerized device 200 can include at least one accessory functional component, such as a graphic user interface assembly 236 that also operate on the power supplied from the external power source 228 (through the power supply 222).

The input/output device 226 is used for communications to and from the computerized device 200. The processor 224 controls the various actions of the computerized device. A non-transitory computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 12, a body housing 200 has one or more functional components that operate on power supplied from the alternating current (AC) 228 by the power supply 222. The power supply 222 can comprise a power storage element (e.g., a battery) and connects to an external alternating current power source 228 and converts the external power into the type of power needed by the various components.

Figure 13:
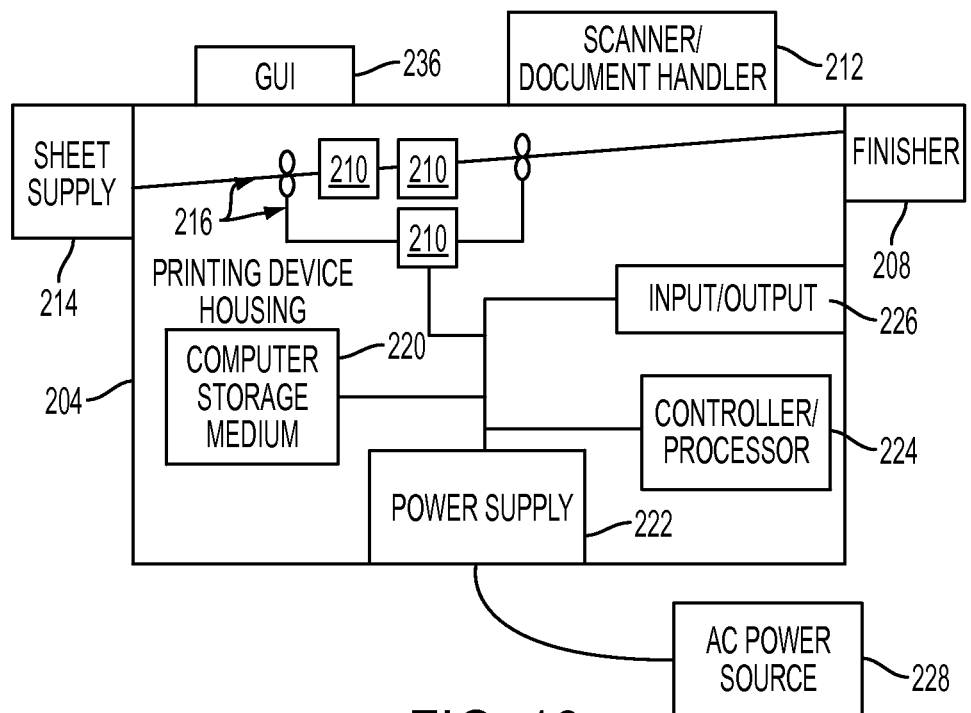
FIG. 13 is a schematic diagram illustrating devices herein.

FIG. 13 illustrates more details of one of the exemplary computerized device that is a printing device 204 mentioned above, which can be used with systems and methods herein and can comprise, for example, a printer, copier, multi-function machine, multi-function device (MFD), etc. The printing device 204 includes many of the components mentioned above and at least one marking device (printing engines) 210 operatively connected to the processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operate on the power supplied from the external power source 228 (through the power supply 222).

Thus, as shown above, with systems and methods herein, a flat pattern printed three-dimensional container is in-line printed or pre-printed on media. This printed three-dimensional flat pattern is printed ahead of (as part of print job) the product to be stacked inside of the folded container. A bar code (or any other type of communication to the cutting device and robot) can dictate the patterns to cut. The flat pattern printed three-dimensional container is then cut (laser, dye cut or other device), picked robotically (or any other mechanical device) via an end affecter that has pneumatic vacuum pickers/punch, and is then formed robotically (or other mechanical device) into a form dye. The mechanical robot end affecter/pneumatic vacuum picker (or any other mechanical type devices) has the ability to be dynamically adjusted ("on the fly") to enable various size three-dimensional flat containers to be picked and formed. The form dye can also be dynamically adjusted to allow multiple size three-dimensional containers to be formed within. This concept can also be used for pre-printed and cut containers. The robot picks the flat pattern, forms it and places on the conveyor.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A system comprising:
   a computerized device receiving a single processing job, said single processing job comprising a container page, product pages, and a stacking pattern;
   a patterning device, operatively connected to said computerized device, automatically patterning a first material according to a container pattern specified by said container page of said single processing job while processing said single processing job to output a flat and patterned container sheet to a stacking location;
   a robotic folding device, operatively connected to said computerized device, automatically folding said flat and patterned container sheet at said stacking location while processing said single processing job to form a three-dimensional container, said patterning device automatically patterning additional sheets of material according to a product pattern specified by said product pages of said single processing job while processing said single processing job, after said three-dimensional container is formed, to output product items to said stacking location without producing intervening output between said three-dimensional container and said product items; and
   a robotic stacking device, operatively connected to said computerized device, automatically stacking said product items in said three-dimensional container according to said stacking pattern of said single processing job while processing said single processing job,
   said container pattern of said container page of said single processing job having a specific size and shape to accommodate said stacking pattern of said single processing job.

2. The system according to claim 1, said patterning device patterning multiple sheets of said first material before patterning said additional sheets of material to output multiple flat container sheets stacked at said stacking location, and
   said robotic folding device obtaining, one at a time, said flat and patterned container sheet from said multiple flat container sheets stacked at said stacking location as additional ones of said three-dimensional container are needed by said stacking of said product items.

3. The system according to claim 1, said additional sheets of material comprising a second material different than said first material.

4. The system according to claim 1, said robotic folding device automatically folding a cover of said three-dimensional container after said stacking of said product items fills said three-dimensional container, and
   said system further comprising an automated sealer device operatively connected to said computerized device automatically sealing said cover of said three-dimensional container after said robotic folding device automatically folding said cover.

5. The system according to claim 1, said three-dimensional container being maintained at said stacking location during said folding of said flat and patterned container sheet and stacking of said product items.

6. The system according to claim 1, said single processing job comprising a series of different single processing jobs, each of said single processing jobs in said series having differences between at least one of:
   said container pattern in said container page;
   said product pattern in said product pages; and
   said stacking pattern.

7. A system comprising:
   a computerized device receiving a single print job, said single print job comprising a container page, product pages, and a stacking pattern;
   a patterning device, operatively connected to said computerized device, automatically patterning a first material according to a container pattern specified by said container page of said single print job while processing said single print job to output a flat and patterned container sheet to a stacking location;
   a robotic folding device, operatively connected to said computerized device, automatically folding said flat and patterned container sheet at said stacking location while processing said single print job to form a three-dimensional container;
   a printing engine, operatively connected to said computerized device, automatically printing markings specified by said product pages of said single print job on additional sheets of material while processing said single print job, said patterning device automatically patterning said additional sheets of material according to a product pattern specified by said product pages of said single print job while processing said single print job, after said three-dimensional container is formed and said markings are printed, to output product items to said stacking location without producing intervening output between said three-dimensional container and said product items; and
   a robotic stacking device, operatively connected to said computerized device, automatically stacking said product items in said three-dimensional container according to said stacking pattern of said single print job while processing said print job,
   said container pattern of said container page of said single print job having a specific size and shape to accommodate said stacking pattern of said single print job.

8. The system according to claim 7, said patterning device patterning multiple sheets of said first material before patterning said additional sheets of material to output multiple flat container sheets stacked at said stacking location, and
   said robotic folding device obtaining, one at a time, said flat and patterned container sheet from said multiple flat container sheets stacked at said stacking location as additional ones of said three-dimensional container are needed by said stacking of said product items.

9. The system according to claim 7, said additional sheets of material comprising a second material different than said first material.

10. The system according to claim 7, said robotic folding device automatically folding a cover of said three-dimensional container after said stacking of said product items fills said three-dimensional container, and
    said system further comprising an automated sealer device operatively connected to said computerized device automatically sealing said cover of said three-dimensional container after said robotic folding device automatically folding said cover.

11. The system according to claim 7, said three-dimensional container being maintained at said stacking location during said folding of said flat and patterned container sheet and said stacking of said product items.

12. The system according to claim 7, said single print job comprising a series of different single print jobs, each of said single print jobs in said series having differences between at least one of:

said container pattern in said container page;
said product pattern in said product pages; and
said stacking pattern.

13. A method comprising:
receiving a single processing job into a computerized device, said single processing job comprising a container page, product pages, and a stacking pattern;
automatically patterning a first material according to a container pattern specified by said container page of said single processing job while processing said single processing job to output a flat and patterned container sheet to a stacking location using a patterning device operatively connected to said computerized device;
automatically folding said flat and patterned container sheet at said stacking location while processing said single processing job to form a three-dimensional container using a robotic folding device operatively connected to said computerized device;
after said three-dimensional container is formed, automatically patterning additional sheets of material according to a product pattern specified by said product pages of said single processing job while processing said single processing job to output product items to said stacking location using said patterning device without producing intervening output between said three-dimensional container and said product items; and
automatically stacking said product items in said three-dimensional container using a robotic stacking device operatively connected to said computerized device while processing said single processing job,
said container pattern of said container page of said single processing job having a specific size and shape to accommodate said stacking pattern of said single processing job.

14. The method according to claim 13, said patterning of said first material comprising patterning multiple sheets of said first material before said patterning of said additional sheets of material to output multiple flat container sheets stacked at said stacking location, and
said folding of said flat and patterned container sheet further comprising obtaining, one at a time, said flat and patterned container sheet from said multiple flat container sheets stacked at said stacking location as additional ones of said three-dimensional container are needed by said stacking of said product items.

15. The method according to claim 13, said additional sheets of material comprising a second material different than said first material.

16. The method according to claim 13, further comprising:
automatically folding a cover of said three-dimensional container using said robotic folding device after said stacking of said product items fills said three-dimensional container; and
automatically sealing said cover of said three-dimensional container using an automated sealer device operatively connected to said computerized device after said automatically folding of said cover.

17. The method according to claim 13, further comprising maintaining said three-dimensional container at said stacking location during said folding of said flat and patterned container sheet and said stacking of said product items.

18. The method according to claim 13, said receiving of said single processing job comprising receiving a series of different single print jobs, each of said single print jobs in said series having differences between at least one of:
said container pattern in said container page;
said product pattern in said product pages; and
said stacking pattern.

19. A method comprising:
receiving a single print job into a computerized device, said single print job comprising a container page, product pages, and a stacking pattern;
automatically patterning a first material according to a container pattern specified by said container page of said single print job while processing said single print job to output a flat and patterned container sheet to a stacking location using a patterning device operatively connected to said computerized device;
automatically folding said flat and patterned container sheet at said stacking location while processing said single print job to form a three-dimensional container using a robotic folding device operatively connected to said computerized device;
automatically printing markings specified by said product pages of said single print job on additional sheets of material while processing said single print job using a printing engine operatively connected to said computerized device;
after said three-dimensional container is formed and said markings are printed, automatically patterning said additional sheets of material according to a product pattern specified by said product pages of said single print job while processing said single print job to output product items to said stacking location using said patterning device without producing intervening output between said three-dimensional container and said product items; and
automatically stacking said product items in said three-dimensional container according to said stacking pattern of said single print job while processing said single print job using a robotic stacking device operatively connected to said computerized device,
said container pattern of said container page of said single print job having a specific size and shape to accommodate said stacking pattern of said single print job.

20. The method according to claim 19, said patterning of said first material comprising patterning multiple sheets of said first material to output multiple flat container sheets stacked at said stacking location, and
said folding of said flat and patterned container sheet further comprising obtaining, one at a time, said flat and patterned container sheet from said multiple flat container sheets stacked at said stacking location as additional ones of said three-dimensional container are needed by said stacking of said product items.

21. The method according to claim 19, said additional sheets of material comprising a second material different than said first material.

22. The method according to claim 19, further comprising:
automatically folding a cover of said three-dimensional container using said robotic folding device after said stacking of said product items fills said three-dimensional container; and
automatically sealing said cover of said three-dimensional container using an automated sealer device operatively connected to said computerized device after said automatically folding of said cover.

23. The method according to claim 19, further comprising maintaining said three-dimensional container at said stacking location during said folding of said flat and patterned container sheet and said stacking of said product items.

24. The method according to claim 19, said receiving of said single print job comprising receiving a series of different single print jobs, each of said single print jobs in said series having differences between at least one of:
 said container pattern in said container page;
 said product pattern in said product pages; and
 said stacking pattern.

* * * * *